United States Patent [19]

Williamson

[11] Patent Number: 5,439,257

[45] Date of Patent: Aug. 8, 1995

[54] BRAZED HYDRAULIC FITTINGS WITH INTERFERENCE FIT AND METHOD OF MAKING SAME

[75] Inventor: Nigel D. L. Williamson, Fort Wayne, Ind.

[73] Assignee: NWD International Inc., Morencie, Mich.

[21] Appl. No.: 192,716

[22] Filed: Feb. 7, 1994

Related U.S. Application Data

[63] Continuation-in-part of Ser. No. 915,007, Jul. 16, 1992, abandoned.

[51] Int. Cl.$^6$ .............. F16L 13/08; B23K 101/04
[52] U.S. Cl. ........................ 285/286; 228/132; 285/287
[58] Field of Search .......... 285/286, 287, 179; 228/132, 168, 174, 253

[56] References Cited

U.S. PATENT DOCUMENTS

| | | | |
|---|---|---|---|
| 1,801,171 | 4/1931 | Mueller . | |
| 2,033,122 | 3/1936 | Cornell, Jr. | 285/287 |
| 2,038,870 | 4/1936 | Rader et al. | 285/287 |
| 3,260,539 | 7/1966 | Herron | 285/24 |
| 3,293,740 | 12/1966 | Enders | 285/287 |
| 3,372,476 | 1/1966 | Peiffer | 29/628 |
| 3,427,707 | 2/1969 | Nowosadko | 29/482 |
| 3,572,773 | 3/1971 | Bloom | 285/287 |
| 4,844,322 | 7/1989 | Flowers et al. | 285/287 |
| 4,887,853 | 12/1989 | Flowers et al. | 285/287 |
| 5,101,889 | 4/1992 | Potier | 285/287 |
| 5,358,168 | 10/1994 | Williamson | 285/287 |
| 5,380,048 | 1/1995 | Vogel | 285/287 |

FOREIGN PATENT DOCUMENTS

| | | | |
|---|---|---|---|
| 718264 | 11/1954 | United Kingdom . | |
| 289249 | 8/1971 | U.S.S.R. | 285/287 |

*Primary Examiner*—Erik K. Nicholson
*Attorney, Agent, or Firm*—Baker & Daniels

[57] ABSTRACT

The present invention is a brazed fitting suitable for use as a hydraulic coupling for pressurized fluids. In the first embodiment, the male component has a tapered surface which mates and creates an interface with a similarly tapered surface of a female component. A brazing material is heated to diffuse and alloy within the interface, forming a connection between the surface portions which is stronger than the metal being connected. A groove on the male component retains the brazing material within the surface portions so that after the components are joined in an interference fit, the assembly is heated and the brazing material melts within the interface and connects together the mating surface by diffusing and alloying. The counterbore of the female component does not require a base, and the resulting structure has improved fluid flow characteristics. In the second embodiment, the male component is generally cylindrical and the female component has a bore with a first aligning portion having a greater diameter than the male components, a second mating portion with approximately the same diameter, and a third guiding portion having a tapered surface connecting the first and second portions. The male portion is first positioned and aligned in the first portion before being pressed and creating an interference fit in the second portion before brazing. In the third embodiment, a tube is used as the male component which is pressed into the bore as in the second embodiment, but with the second portion of the bore having a shoulder portion for abutting the end of the tube.

24 Claims, 4 Drawing Sheets

BRAZED HYDRAULIC FITTINGS WITH INTERFERENCE FIT AND METHOD OF MAKING SAME

CROSS-REFERENCE TO RELATED APPLICATIONS

The present application is a continuation-in-part of U.S. patent application Ser. No. 07/915,007, filed Jul. 16, 1992, assigned to the assignee of the present invention now abandoned.

BACKGROUND OF THE INVENTION

1. Field of the Invention

The present invention relates generally to hydraulic or pneumatic fittings. More specifically, the field of the invention is that of brazed fittings for forming hydraulic couplings.

2. Description of the Related Art

Hydraulic fittings are conventionally of brazed construction, particularly those fittings having a specially shaped design. Conventional brazed fittings are manufactured by a press fit methodology, whereby the typically steel components are bored or counterbored to a precise diameter. There is usually a lead-in taper of 45° at the outer end of the conduit which has counterbore aiding in locating the mating port. The conduit end includes a spigot which enters the counterbore with an interference fit of between 0.0005 inches and 0.005 inches, requiring that each part be made to a maximum tolerance of ±0.001125 inches. A brazing material, for example a pure copper or copper compound formed in a ring, is located between the bottom of the spigot and the base of the counterbore. During the heating, the brazing material melts and is drawn up the interference fit by capillary attraction. The brazing material diffuses and alloys with the metal of the components so that the interface between the spigot and the counterbore is stronger than material of the components. Ideally, the resulting integral fitting produces a high degree of integrity and reliably performs its intended function, while minimizing production costs.

An alternative to brazed fittings involves the use of multiple fittings which are required in order to connect different sized tubes, ports, etc.. However, the formation of the multiple connections requires additional material, as well as additional manufacturing time, which is duplicative and wasteful. Further, each connection provides another possible leak path for the pressurized medium within the fitting. Therefore, brazed fittings are preferable because they are generally less expensive to manufacture, less expensive to install, and have fewer potential leak paths.

However, on the rare occasions when a brazen fitting fails, the failure is typically catastrophic. For example, the intruding component of the brazed fitting may break loose from its mating part, usually while containing fluids under high pressure, resulting in a rapid deterioration of the hydraulic system. This is usually the result of the brazed fitting being poorly formed, typically due to insufficient "wetting" of the mating surfaces which are brazed together. The insufficient "wetting" may be due to misalignment or imprecise manufacture of the components which are press fit together. Additionally, poorly formed brazed fittings may leak in service, and also may contribute to improper alignment with other components in a system.

One particular problem with such fittings involves the intruding part being subject to misalignment during assembly. For example, the lead-in of the intruding conduit end may not be evenly aligned with the corresponding lead-in chamfer of the port which allows the conduit end to cant over prior to the application of assembly force. When assembly force is applied, the conduit end is driven down the chamfer and areas of alternating high and low interference fit are created. These areas of low integrity interference fit are areas of potential porosity and of weakness under pressurized loads.

Also, a common side effect of conventional brazing is the formation of a sharp-edged skin at the visible joint line between the assembled conduit end and the port. This is caused by the port gouging some material from the surface of the conduit end as it is press fit during assembly, and the gouged material is an unsightly blemish. Further, the seal between the brazed surfaces may become porous and have substantially reduced strength similar to misaligned components.

Another potential problem with conventional brazing techniques, although much rarer than the aforementioned problems, is that penetration of the brazing material into the interface between the mating surfaces may be insufficient to form a reliable brazed connection. The brazing connection depends on the mating surfaces being closely positioned, and on the brazing material being in contact with the mating surfaces when in the liquid state. If the mating surfaces are not properly formed, or the brazing material is not in contact with both of the mating surfaces, the liquid brazing material tends to flow away from the mating surfaces—being drawn by its own surface tension into a rounded mass of liquid away from the interface of the mating surfaces. After the rounded mass cools, it forms a solid mass which does not aid in bonding together the mating surfaces, and which also may go undetected until failure of the coupling.

What is needed is an improved method of brazing together components of hydraulic fittings.

A further need exists for a brazing method which aligns the components more precisely.

Another need exists for a brazing method which avoids gouging the components during manufacture.

Also needed is a brazing method which ensures penetration of the brazing material into the interface of mating surfaces.

SUMMARY OF THE INVENTION

The present invention involves a method of brazing together components of hydraulic fittings which has greater reliability and accuracy than the aforementioned prior art methods. The female component is formed with an aligning portion which facilitates the alignment of the components. The female component also includes a guiding portion having a tapered surface which eases insertion of the male component and deters gouging of the components during the manufacture. Also, the female component has a mating portion which forms an interference fit with the male component to maximize penetration of brazing material into the interface between the components. This structure thereby facilitates the connection of the male and female components by first facilitating the alignment of the components, then facilitating the creation of an interference fit while minimizing gouging so that when the joined components are heated, the brazing material diffuses evenly through the interference fit and secures the mating surfaces.

One advantage of the present invention is that the fitting components may be manufactured more easily. The relatively slight taper of the guiding surface allows for greater manufacturing tolerances, for example about ±0.003 inches, which lowers the difficulty and expense of manufacturing the components of the fitting. Further, the slight tapers are self-aligning in a relatively tight interference fit and do not tend to gouge when pressed together so that the components may be readily and reliably assembled. Misalignment of the components is also minimized by the aligning portion which constrains the male component from lateral movement prior to assembly.

Another advantage is obtained by locating the brazing material in a groove in the spigot of the male component. This locates the brazing material at the site of the brazing and the interference fit between the mating surfaces ensures that the liquid brazing material penetrates and secures the interface. This causes the brazing material to diffuse within the metal and form a region of alloy which is stronger than the pure metal itself. Both peel testing and shock loading testing on fittings made according to the present invention have shown that the pure metal breaks before the alloy portion at the brazing site.

The internal flow characteristics are improved for a hydraulic coupling formed according to the invention. The port may be machined without a base so that the fluid flow is not disturbed by turbulence normally caused by the base of the port. The base is no longer required because the brazing material is located in the groove on the spigot. Further, the internal bore of the spigot may include an internal taper to provide a more laminar flow through the path defined by the receiving taper of the port and the spigot of the conduit end.

Other advantages are also derived from the present invention. For example, unsightly material from one component gouging another is minimized or eliminated. The assembly of the components is much more accurate, making the fittings easier to be used in manufacturing plants. Also, the resulting hydraulic couplings may withstand far greater pressures than those with the prior art brazed fittings, with porosity at the interface being virtually eliminated. In addition, the present invention provides a reliable fitting using a tube as one of the components.

A cylindrical embodiment of the invention particularly addresses the problem of misalignment of the fitting components in the brazing process. Tapered components may be subject to differential expansion during the heating cycle of the brazing process causing partial separation. This potential problem may be countered by strict adherence to machining specifications in an ideal processing environment, but maintaining such adherence to specifications and an ideal processing environment may not be economically feasible. However, mating cylindrical surfaces are much less prone to such separation caused by differential expansion, and this cylindrical embodiment of the invention helps to avoid such potential weak points in the interface between fitting components.

This cylindrical embodiment of the invention is important in securing a tube as one of the components of the hydraulic fitting. When a tube is pressed into a conventional braze counterbore, the outer surface of the tube tends to scrape off and peel back at the corner between the chamfer and the sides of the counterbore ("skinning"). The gouged surface of the tube contacts the internal diameter of the bore only where the "skinning" is minimal, and gaps are formed in the areas of scraping and peeling which work against the formation of a strong brazed connection. Also, the standard lead-in chamfer is oriented at a 45° angle which does not provide any means for properly aligning the tube. This cylindrical embodiment of the invention has a specially configured counterbore, with a first guiding portion having a diameter greater than the tube, a second tapered portion which provides a transition to a third interference portion which has an inner diameter designed to create an interference fit with the outer diameter of the tube. The first guiding portion also provides stress relief to the tube by spreading the stress of the assembly over a greater length, and by the soft braze material which supports the tube in the bore.

The present invention, in one form, is a process for brazing together a male and a female component of a fitting for forming a hydraulic coupling, wherein the male component is generally cylindrical. First, a bore is formed in the female component, with the bore having three distinct portions. The first generally cylindrical aligning portion of the bore has a diameter greater than the diameter of the male component. The second generally cylindrical mating portion of the bore has a diameter approximately equal to the diameter of the male component. The third guiding portion of the bore has a tapered surface connecting the first and second portions of the bore. In the next step, the male component is located within the first portion of the bore and thereby aligns the male component within the bore. Then, the male component is pressed into the second portion of the bore to create an interference fit between the male and female components. A brazing material is located adjacent the interference fit. Lastly, the male and female components are heated to melt brazing material whereby liquid brazing material penetrates the interference fit.

The present invention, in another form, is a brazed fitting formed by the above process wherein the brazing material is diffused and alloyed between the surfaces of the interference fit.

One object of the present invention is to provide an improved method of brazing together components of hydraulic fittings.

A further object is to provide a brazing method which aligns the components more precisely.

Another object is to provide a brazing method which avoids gouging the components during manufacture.

Also an object is to provide a brazing method which ensures penetration of the brazing material into the interface of mating surfaces.

An additional object is to provide a structure which maintains the alignment of the fitting components.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
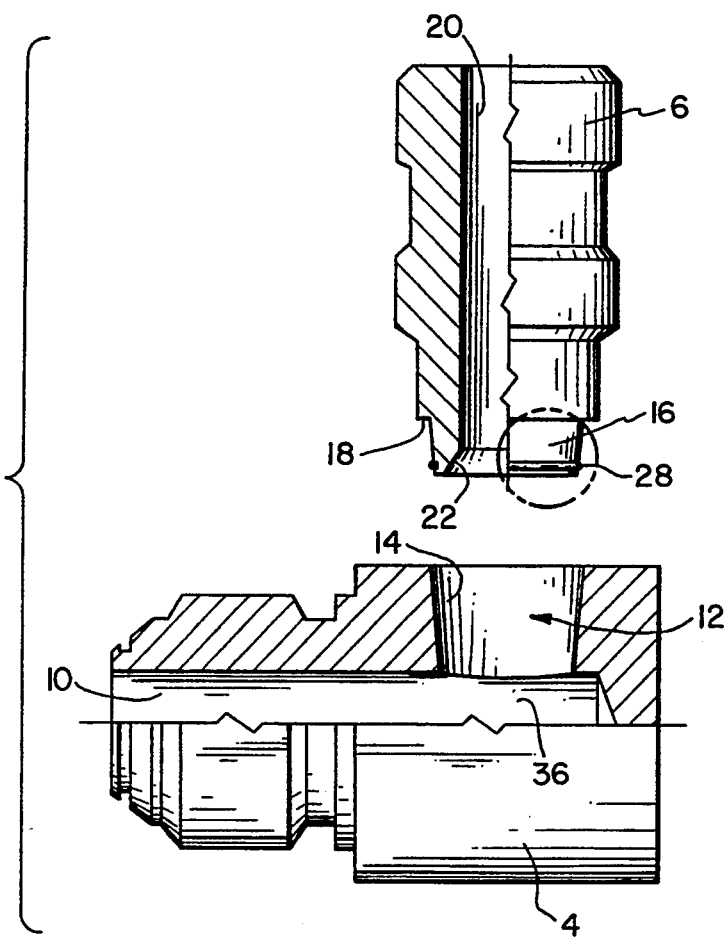
FIG. 1 is an exploded side view, in partial cross-section, of a first embodiment of the fitting components before brazing.

Corresponding reference characters indicate corresponding parts throughout the several views. The exemplifications set out herein illustrates preferred embodiments of the invention, in several forms, and such exemplifications are not to be construed as limiting the scope of the invention in any manner.

DESCRIPTION OF THE PREFERRED EMBODIMENTS

The preferred embodiments disclosed below are not intended to be exhaustive or limit the invention to the precise forms disclosed in the following detailed description. Rather, the embodiments are chosen and described so that others skilled in the art may utilize their teachings.

Figure 3:
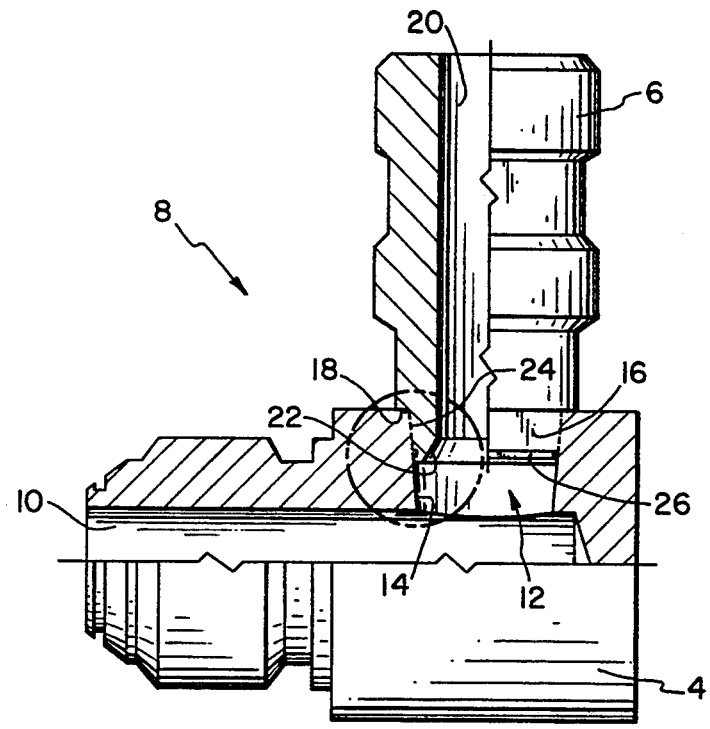
FIG. 3 is a side view, in partial cross-section, of the brazed hydraulic fitting of FIG. 1.

The present invention involves a fitting formed by brazing which is adapted to serve as a hydraulic coupling for a pressurized fluid. FIG. 1 shows two components of the first embodiment, namely port body 4 and conduit end 6, which are brazed together to form brazed fitting 8 shown in FIG. 3. Port body 4 includes internal fluid passageway 10 in fluid communication with port opening or counterbore 12 defined by port surface portion 14. Conduit end or spud 6 includes spigot 16 which has a surface portion which is shaped to match the contour of port surface portion 14, with spigot 16 extending from shoulder 18. Bore 20 extends through the axial center of conduit end 6, with bore 20 including optional radially outwardly extending tapered surface 22 within spigot 16. As shown in FIG. 3, port surface portion 14 and spigot 16 abut to form interface 24 between their outer surfaces.

In accordance with one aspect of the present invention, port surface portion 14 and spigot 16 are tapered. Interface 24 has a relatively high unit loading up which a brazing material flows by capillary attraction during the brazing process. The tapered fit of port surface portion 14 and spigot 16 help to align interface 24, and shoulder 18 further facilitates the alignment of conduit end 6 in port body 4. The taper angle, relative to the central axis of conduit end 6, is slight, for example equal to or less than about 10°, and preferably about 5°. This allows port surface portion 14 and spigot 16 to be produced within greater tolerances than conventional surfaces prepared for brazing.

Figure 2:
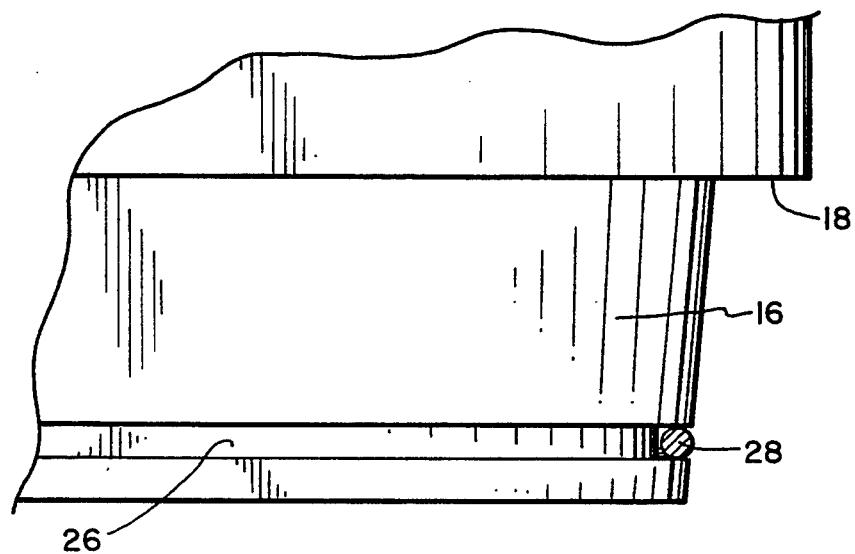
FIG. 2 is an enlarged view, in partial cross-section, of the highlighted portion of FIG. 1 showing the male fitting component.

In accordance with another aspect of the invention, conduit end 6 includes groove 26 which is used to retain brazing material 28 before the insertion of spigot 16 into port surface portion 14 (FIG. 2). While conventional brazing involves depositing the brazing material at one end of the interface of surfaces to be brazed together, groove 26 advantageously locates brazing material 28 within the interface 24. This location prevents any pooling away of any melted brazing material from interface 24, because groove 26 remains in communication with interface 24. Groove 26 is preferably located in spigot 16 at the end proximate to port surface portion 14, although a groove for retaining brazing material may be located in either the port surface portion or the spigot.

Fitting 8 is manufactured from two components to be connected together. The two components, for example port body 4 and conduit end 6, have their mating surfaces formed with a slight taper. The manufacture continues by depositing brazing material within a groove of one of the components, for example groove 26 of spigot 16. Next with this example, spigot 16 is positioned to intrude into port opening 12 and pressed to form an assembly by interference fit with port surface portion 14. The assembled components are heated to a brazing temperature so that the brazing material is drawn into interface 24 by capillary attraction. In the brazing process, the melted brazing material diffuses into the interstices between port surface portion 14 and spigot 16, associates with the metal material of the components, and forms alloys with that metal material which have greater strength than the original metal material.

Figure 4:
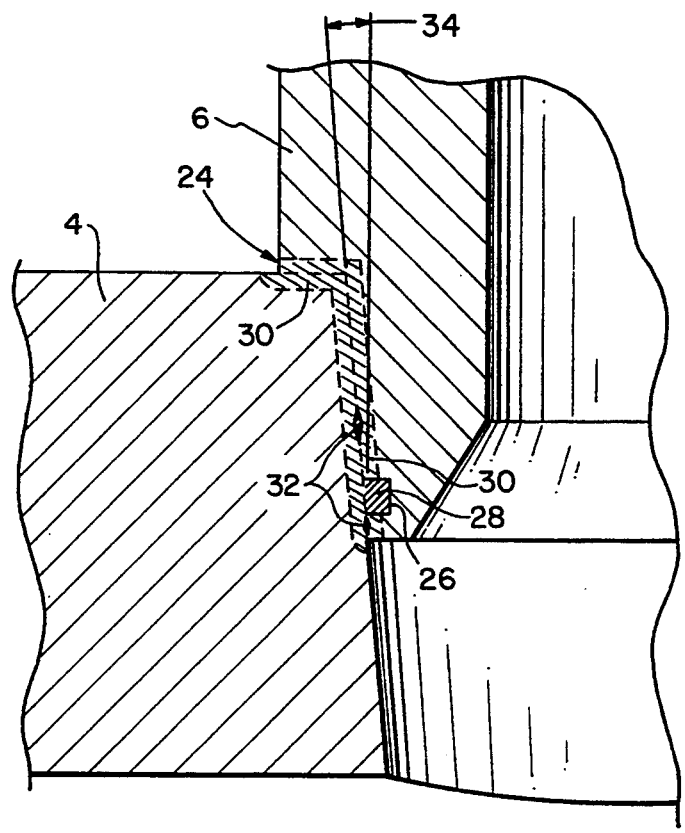
FIG. 4 is an enlarged view, in partial cross-section, of the highlighted portion of FIG. 3 showing the interface between the brazed components.

The enlarged view of interface 24 in FIG. 4 shows that alloyed regions 30 are created after the brazing material melts and bonds with the material of port 4 and conduit end 6. Although not desired, the imperfections of the mating tapered surfaces also create small pockets 32 of brazing material between the material of port 4 and conduit end 6. Although ideally all of interface 24 would consist of alloyed regions 30, practicalities of manufacturing result in some of the braze interface 24 being pure brazing material. However, the tapered structure formed with taper angle 34 greatly facilitates the formation of alloyed regions 30.

Used as a hydraulic coupling, fitting 8 provides improved fluid flow characteristics due to the continuous taper of counterbore 12 to fluid passageway 10. Compared to prior art brazed hydraulic couplings which include a base portion forming a surface perpendicular to flow coming through bore 20, port surface portion 14 has a surface which tapers only slightly from being parallel to the flow through bore 20 and which continuously and uninterruptedly extends to passageway 10. Also, surface 22 of bore 20 may taper outwardly and further promote more uniform fluid flow by providing a gradual expansion of the cross-sectional fluid flow area. The slight taper of the surfaces exposed to fluid flow, along with the absence of any significant stop or drag in the port-conduit connection, minimizes the turbulence created at bend 36 of the hydraulic coupling provided by fitting 8.

In the preferred form of the first embodiment, port body 4 and conduit end 6 are formed conventionally from steel. Brazing material 28 may be any suitable metal or alloy, for example copper. The copper may be in the form of a wire inserted into groove 26 as depicted in FIG. 2, or alternatively a copper paste or other brazing material may be deposited within groove 26. The depth of groove 24 is in the range of about 0.3 mm to 1.0 mm, and preferably about 0.75 mm.

Figure 5:
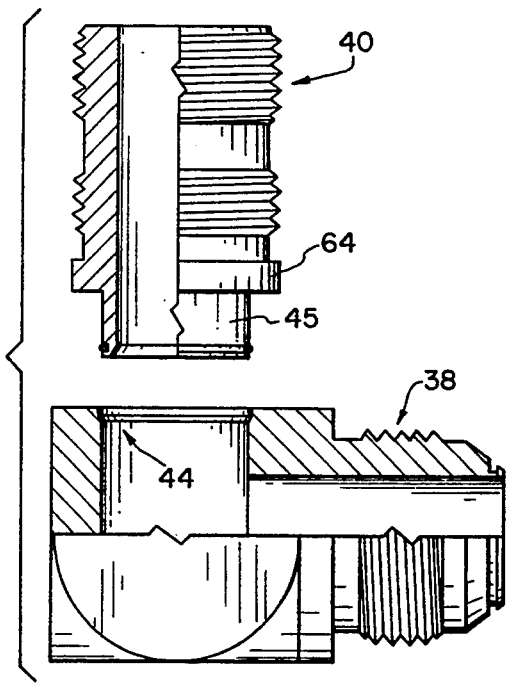
FIG. 5 is an exploded side view, in partial cross-section, of a second embodiment of the fitting components before brazing.
Figure 6:
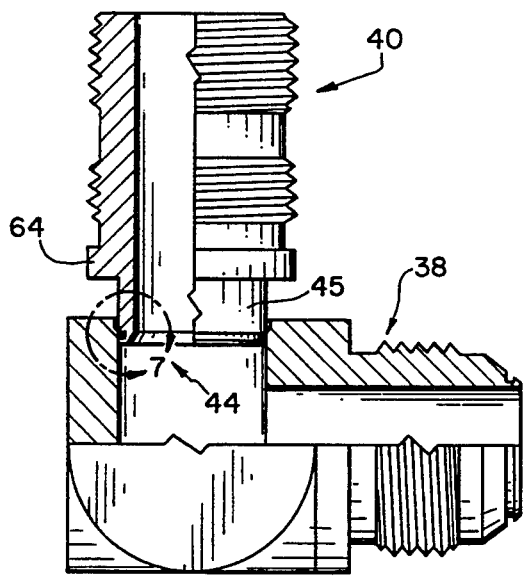
FIG. 6 is a side view, in partial cross-section, of the fitting components of FIG. 5 during the aligning portion of the assembly process.
Figure 8:
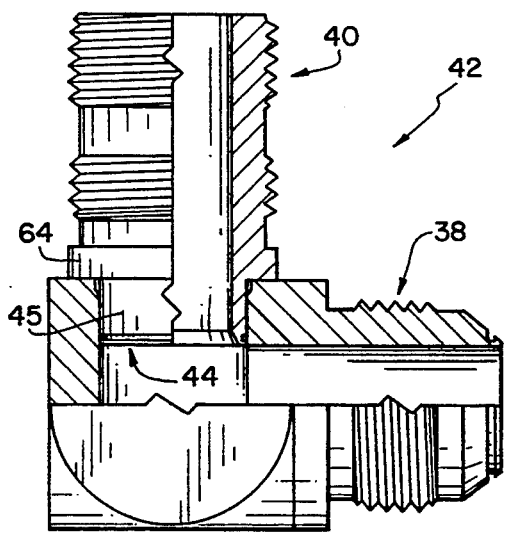
FIG. 8 is a side view, in partial cross-section, of the fitting components after pressing and brazing.
Figure 7:
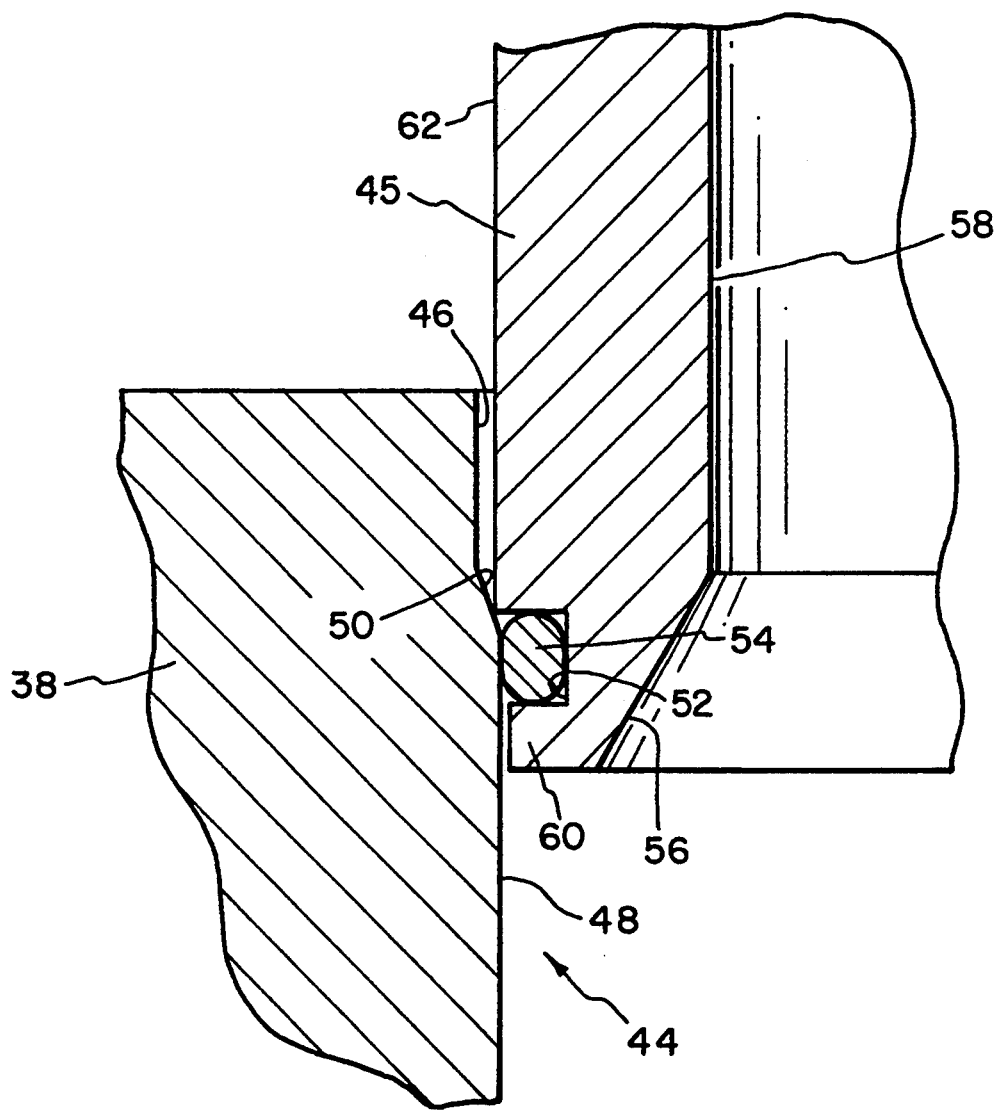
FIG. 7 is an enlarged view, in partial cross-section, of the highlighted portion of FIG. 6 showing the alignment of the fitting components.

FIG. 5 shows the two components of the second embodiment, namely port body 38 and conduit 40, which are brazed together to form brazed fitting 42 shown in FIG. 8. Port body 38 includes counter bore 44 which has three separately defined portions, which together comprise the braze port into which mating component 40 is assembled. FIG. 6 shows an intermediate step in forming brazed fitting 42, wherein spigot 45 of conduit 40 is partially inserted into bore 44 of port body 38. As shown in more detail in FIG. 7, bore 44 includes aligning portion 46 which has an inner diameter slightly greater than the outer diameter of spigot 45. Bore 44 also includes a mating portion 48 which has an inner diameter approximately equal to or slightly smaller than the outer diameter of spigot 45 so that mating portion 48 interferes with the outer diameter of spigot 45. Guiding portion 50 of bore 44 has a tapered surface joining the inner diameters of aligning and mating portions 46 and 48 which serves to facilitate the insertion of spigot 45 into port body 38 to form an interference fit between mating portion 48 and spigot 45 without gouging either component.

The taper angle at which the guiding portion 50 of bore 44 is disposed relative to the axis of bore 44 is less than the conventional 45° lead-in chamfer. More particularly, the angle of tapered guiding portion 50 ranges from approximately 35° to approximately 5° relative to the bore axis. In the preferred embodiment, tapered guiding portion 50 is disposed at approximately 15° relative to the bore axis.

Similar to the first embodiment, spigot 45 may include groove 52 which receives brazing material 54, and may also include tapered portion 56 of conduit bore 58. However, in the second embodiment, spigot 45 has a generally cylindrical outer surface. In particular, lead-in portion 60 has an outer cylindrical surface which is slightly smaller than the inner cylindrical surface of mating portion 48 of bore 44. Further, mating surface 62 of spigot 45 has an outer cylindrical diameter which is slightly greater than the inner diameter of bore 44 so that mating surfaces 62 and 48 form an interference fit.

Spigot 45 is inserted into port body 38 in a two step process. First, the components are aligned by inserting spigot 45 into aligning portion 46 until mating surface 62 of spigot 45 abuts guiding portion 50. During this first step, no force is needed because lead-in portion 60 has a smaller outer diameter than the inner diameter of mating surface 48 of bore 44. The second step of the process involves press fitting the two components to form the interference fit. In this second step, the pressing of spigot 45 causes mating surface 62 to travel down guiding portion 50. The taper of guiding portion 50 aids uniform movement of mating surface 62 into mating portion 48 of bore 44. Aligning portion 44 tends to keep the axis of spigot 45 generally coincident with the axis of bore 44. The pressing force continues until stop portion 64 of conduit 40 abuts the top surface of port body 38. At this point the components are connected by an interference fit. Conduit 40 and port body 38 are heated to a temperature in which the brazing material melts and fills the interstices between mating portion 48 and mating surface 62 to form alloyed regions such as described above.

In the second embodiment, the length of aligning portion 46, the length of mating portion 62, and the size of port body 38 may be varied according to different specific applications. Generally, adding to the length of mating portion 62 requires a greater size for port body 38 which requires more materials and adds to the expense of the resulting fitting. Increasing the length of aligning portion 46 increases its effectiveness in maintaining the alignment of spigot 45 within bore 44. However simply increasing the length of aligning portion 46 correspondingly decreases the length of the interference fit between mating portion 48 and mating surface 62.

Figure 9:
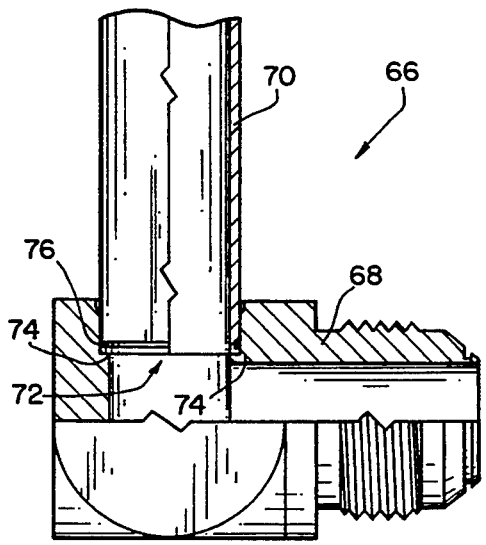
FIG. 9 is a side view, in partial cross-section, of a third embodiment of the fitting components after assembly and brazing.

The third embodiment is shown in assembled form in FIG. 9. Brazed fitting 66 includes port body 68 and tube 70. Port body 68 defines bore 72 which has aligning, guiding, and mating portions similar to bore 44 of the second embodiment. In addition, bore 72 has shoulder 74 which provides an abutting surface for the end of tube 70, and which preferably has a through bore with a diameter approximately equal to the inner diameter of tube 70 to facilitate fluid flow through brazed fitting 66. Located near the end of tube 70, optional groove 76 may provide a location for brazing material. The aligning and guiding portions of bore 72 facilitate the use of tube 70 as the spigot or male member of the fitting. Similar to the second embodiment, the outer diameter of tube 70 is slightly greater than the inner diameter of the mating portion of bore 72 so that an interference fit is created between tube 70 and bore 72.

The aligning portion of the bore helps to align the male fitting or tube and relieve stress applied to the male fitting or tube subsequent to forming the brazed connection. The degree of alignment and the amount of stress relief provided by that outer portion increases according to its length. However, the greater the length of the outer portion of the female component, a corresponding amount of material must be used to provide that greater length thus increasing the cost of the female component. Therefore, the length of the outer portion of the bore depends on the considerations relating to ease of manufacture, durability of the resulting fitting, and cost of the component material.

The disclosed embodiments show the brazing material as a paste which is applied to the components of the fitting. Alternatively, the brazing material may be formed as a ring or other suitable shape and assembled together with the other fitting components prior to the melting step of the manufacturing process. As another alternative, the brazing material may be made in wire form, e.g., copper wire, which is wrapped about the connection of the fitting components so that the wire may melt and diffuse into the interstices between the mating surfaces. In the second and third embodiments, the aligning portion of the bore may provide an alternate location for the application of the brazing material, so that a groove does not need to be formed in the male member or tube.

While this invention has been described as having a preferred design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A process for brazing together a male and a female component of a fitting for forming a hydraulic coupling, the male component being generally cylindrical, said process comprising the steps of:

forming a bore in the female component, the bore having three distinct portions, a first generally cylindrical aligning portion having a diameter greater than the diameter of the male component, a second generally cylindrical mating portion having a diameter approximately equal to the diameter of the male component, and a third guiding portion with a tapered surface connecting the aligning and mating portions;

locating a brazing material in one of the female and male components so that the brazing material is located within the interface between the mating portion of the female component when the male component is pressed into an interference fit with the female component;

locating the male component within the aligning portion of the bore and thereby aligning the male component with the bore;

pressing the male component into the mating portion of the bore to create an interference fit between the male and female components; and heating the male and female components to melt the brazing material whereby liquid brazing material penetrates the interstices between the male and female components to form a brazed connection.

2. The process of claim 1 further comprising the step of forming a groove in the male component and locating brazing material in the groove.

3. The process of claim 2 wherein said groove formed in said step of forming a groove has a depth in the range of about 0.3 mm to 1.0 mm.

4. The process of claim 2 wherein the groove formed in said step of forming a groove is located proximate the intersection of the bore and the end of said male component extending into the bore.

5. The process of claim 1 wherein the guiding portion created in said step of forming the bore is oriented at less than 45° relative to the axis of the bore.

6. The process of claim 1 wherein the guiding portion created in said step of forming the bore is oriented in the range of approximately 35° to 5° relative to the axis of the bore.

7. The process of claim 1 wherein the guiding portion created in said step of forming the bore is oriented at approximately 15° relative to the axis of the bore.

8. The process of claim 1 further comprising the step of applying brazing material in the aligning portion.

9. The process of claim 1 further comprising the step of forming a shoulder at the terminal end of the bore of the female component, wherein the male component comprises a tube which is pressed into abutment with the shoulder of the female component.

10. The process of claim 9 wherein the step of forming a shoulder includes forming a shoulder with an inner diameter approximately equal to the inner diameter of the tube.

11. The process of claim 1 wherein the mating portion formed in said forming step has a diameter which is smaller than the diameter of the male component.

12. The process of claim 1 further comprising the step of forming a taper in the internal bore of the male component at the end of the male component extending into the female component.

13. A brazed fitting comprising:

a first component having a portion with a generally cylindrical exterior surface;

a second component including a bore having at least three distinct portions, a first generally cylindrical aligning portion having a diameter greater than the diameter of said cylindrical exterior surface of said first component, a second generally cylindrical mating portion having a diameter approximately equal to the diameter of said cylindrical exterior surface of said first component, and a third guiding portion with a tapered surface connecting said aligning and mating portions;

said cylindrical exterior surface of said first component and said mating surface of said second component being located in abutting relation and forming an interference fit therebetween;

means for locating brazing material within the interface between said cylindrical exterior surface of said first component and said mating surface of said second component; and a brazing material being diffused and alloyed in interstices in the interface between said cylindrical exterior surface of said first component and said mating surface of said second component.

14. The brazed fitting of claim 13 wherein said first and second components comprise steel material, and said brazing material comprises copper.

15. The brazed fitting of claim 13 wherein one of said cylindrical exterior surface of said first component and said mating surface of said second component includes a groove, and said brazing material is diffused and alloyed by the process of first locating said brazing material within said groove, assembling said cylindrical exterior surface of said first component in abutting relation with said mating surface of said second component, and heating said assembly to melt said brazing material whereby said liquid brazing material bonds in said interference fit between said cylindrical exterior surface of said first component and said mating surface of said second component.

16. The brazed fitting of claim 15 wherein said groove has a depth in the range of about 0.3 mm to 1.0 mm.

17. The brazed fitting of claim 15 wherein said groove has a depth of about 0.75 mm.

18. The brazed fitting of claim 15 wherein said first component intrudes into said second component, and said groove is located in said cylindrical exterior surface of said first component.

19. The brazed fitting of claim 13 wherein said guiding portion is oriented at less than 45° relative to an axis defined by said bore.

20. The brazed fitting of claim 13 wherein said guiding portion is oriented in the range of approximately 35° to 5° relative to an axis defined by said bore.

21. The brazed fitting of claim 13 wherein said guiding portion is oriented at approximately 15° relative to an axis defined by said bore.

22. The brazed fitting of claim 13 wherein said bore of said second component includes a shoulder, and said first component comprises a tube which is pressed into abutment with said shoulder.

23. The brazed fitting of claim 22 wherein said shoulder has an inner diameter approximately equal to the inner diameter of said tube.

24. The brazed fitting of claim 13 wherein said first component includes an internal bore having a taper at the end of said first component which extends into said second component.

* * * * *